No. 615,932. Patented Dec. 13, 1898.
A. G. WATERHOUSE.
AUTOMATIC HEATER AND STERILIZER.
(Application filed Nov. 5, 1897.)

(No Model.)

WITNESSES:
Jno. S. Forbes
Philip Pistor

INVENTOR
Addison G. Waterhouse

THE NORRIS PETERS CO., PHOTO-LITHO., WASHINGTON, D. C.

UNITED STATES PATENT OFFICE.

ADDISON G. WATERHOUSE, OF HARTFORD, CONNECTICUT.

AUTOMATIC HEATER AND STERILIZER.

SPECIFICATION forming part of Letters Patent No. 615,932, dated December 13, 1898.

Application filed November 5, 1897. Serial No. 657,580. (No model.)

*To all whom it may concern:*

Be it known that I, ADDISON G. WATERHOUSE, a citizen of the United States, residing at the city of Hartford, in the State of Connecticut, have invented a new and useful Apparatus for Automatically Heating and Sterilizing Liquids, of which the following is a specification.

My invention consists of an apparatus for automatically regulating the flow of water or liquid being treated to correspond with the amount of heat applied by causing the applied heat to raise the temperature of the liquid being treated, so that the resultant decrease in its specific weight, caused by expansion or by steam or vapor produced in the liquid, will cause it to flow or boil over a weir or passage having a higher level than the source of supply from which the liquid is drawn.

My invention further consists of means for transferring the heat from the liquid after it has passed or boiled over the weir to the cold liquid passing through the apparatus to where heat is applied.

In order to more fully describe my invention, reference will be had to the accompanying drawings, in which—

Figure 1:
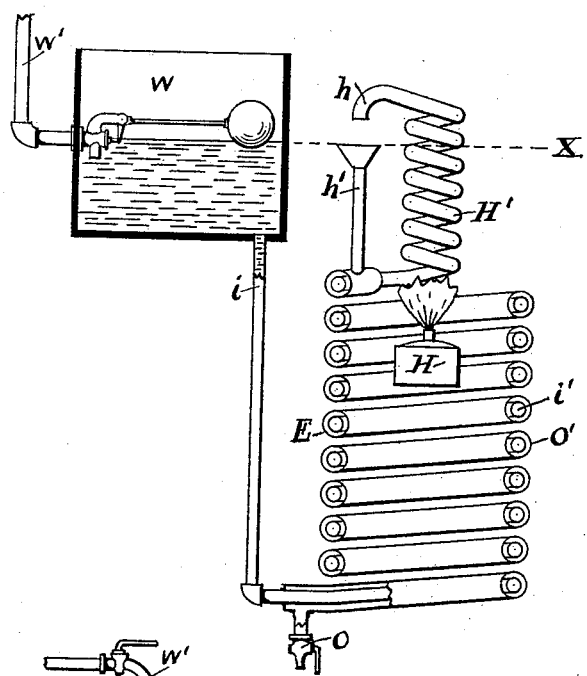
Figure 2:
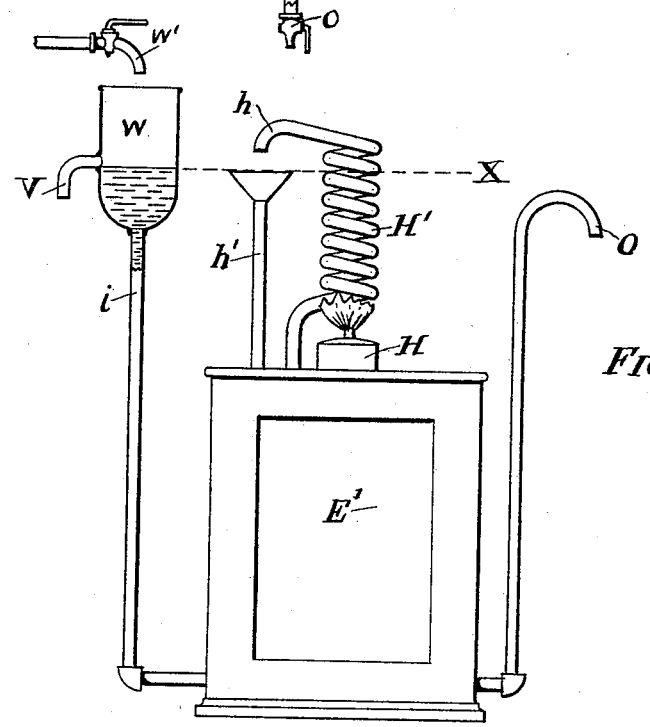

Figure 1 shows diagrammatically an apparatus embodying my invention. Fig. 2 is a modified form of the same apparatus.

Referring to Fig. 1, W shows a water-tank with a pipe W', through which the water enters and is allowed to fill the tank up to the water-level X and no higher, as it is restrained by the float and valve shown in the tank. The water or liquid to be treated passes from tank W down through pipe $i$, then up through the inner tube $i'$ of the coiled heat-transfer E, then out at the top of E through the coiled tube H', where it stops after reaching the water-level X. Heat is applied by the lamp H, which by heating the water in coil H' causes it to boil over at $h$ and pass down through the pipe $h'$ into the outer tube O' of the transfer-coil E, and while passing through E the heat of the water passing down through pipe O' is transferred by conduction to the cold water passing up through pipe $i'$, so that the hot liquid which leaves the heated coil H' while on its way from the apparatus transfers its heat to the cold water passing into the apparatus on its way to the heating-coil H', so that the heated water leaves the apparatus cold and passes out through the discharge-pipe O at the bottom of E, while the cold water from W passes up through the inner coil $i'$ of the heat-transfer E and reaches the coil H' in a hot condition. Therefore the only heat that has to be applied is that necessary to bring the hot water to a state of ebullition and cause it to rise above the water-line X and pass over at $h$, as above described.

Fig. 2 shows a modified form of apparatus, in which the valve and float in tank W are dispensed with and an equivalent device is used, consisting of a tank W, having an overflow-discharge V, which confines the water-level to the line X, regardless of any excess in the flow of water which enters at W'. The heat-transfer or heat-exchange is inclosed by an insulating-case E', and the discharge O is raised to a level near but below the water-line X.

In the drawings I have shown that heat is applied to the liquid while in a coiled tube H'; but in practice any form of heating device may be used that will cause the applied heat to cause the overflow of liquid, as above described.

What I claim as my invention is—

1. An automatic apparatus for heating water or liquids, consisting of a source of supply below the level required for causing the water to flow through the apparatus, a device for applying heat to a part of the water in the apparatus until the boiling-point is reached and the state of ebullition is produced, and means for allowing the water to pass through the apparatus as it is raised above its normal level while in the state of ebullition: substantially as described.

2. An automatic apparatus for heating water or liquids, consisting of a source of supply below the level required for causing water to flow through the apparatus; means for applying heat to a part of the water in the apparatus until the state of ebullition is produced; means for allowing the water to pass through the apparatus after it has been raised above its normal level by means of the heat applied; and means for transferring the heat from the water passing from, to the cold water passing to, the point where heat is applied: substantially as described.

3. In an apparatus for heating water or liquids, the combination of means for applying heat to the water or liquid being treated; means for cooling the heated liquid by the liquid to be heated; and means for employing the difference between the specific weight of the liquid being treated, and that of the steam or vapor generated from such liquids, for causing the flow of the liquid through the apparatus: substantially as and for the purposes set forth.

4. An automatic water-heater; consisting of a supply-tank W provided with a regulating-valve and a float; a heat-exchange E, a boiling-over device H', and means for applying heat: substantially as described.

ADDISON G. WATERHOUSE.

Witnesses:
LAURENCE W. CASE,
JNO. S. FORBES.